May 24, 1949.　　　　H. A. SMITH　　　　2,471,124
CHRISTMAS TREE STAND
Filed Nov. 28, 1947
Fig. 1.
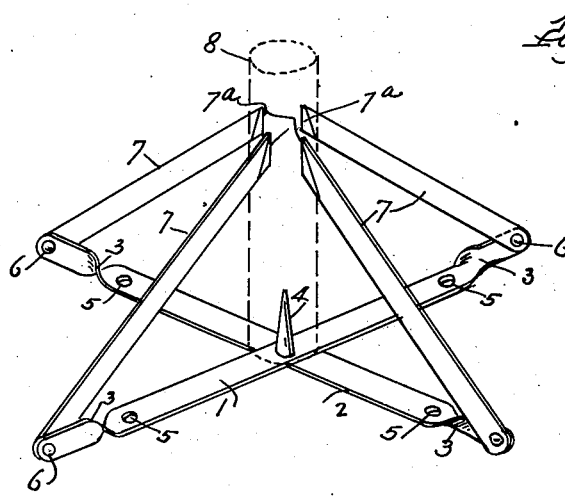
Fig. 2.
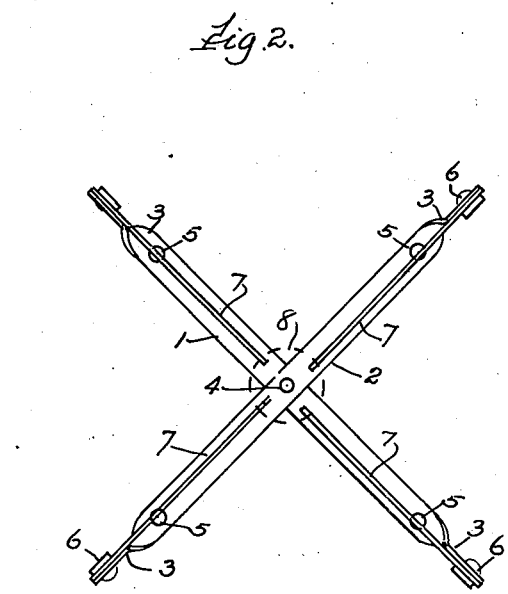
Fig. 3.
Fig. 4.
Fig. 5.
Inventor.
Herman A. Smith
by H. J. Sanders
Attorney.

Patented May 24, 1949

2,471,124

UNITED STATES PATENT OFFICE 2,471,124

CHRISTMAS TREE STAND

Herman Amil Smith, Chicago, Ill., assignor of forty-nine per cent to Maynard A. Williams, Chicago, Ill.

Application November 28, 1947, Serial No. 788,462

1 Claim. (Cl. 248—44)

This invention relates to improvements in Christmas tree stands. The prime object is to provide a type adapted to hold the tree firmly and releasably in upright position. A further object is to provide a Christmas tree stand that in one form may be folded to occupy a small space for convenience in storing or shipping. A further object is to provide a Christmas tree stand that when applied to relatively small trees need not necessarily be so firmly secured thereto as when used to support larger and heavier trees or those carrying a relatively heavy load. A further object is to provide a Christmas tree stand that may be less firmly secured to the tree when only lightly loaded and more firmly applied thereafter when the tree is heavily burdened with its load.

A further object is to provide a Christmas tree stand that is simple in construction and arrangement of parts, durable in use, positive and efficient in operation and inexpensive to manufacture. Other objects, novel features and advantages of arrangement, construction and design comprehended by the invention are hereinafter more fully pointed out or made apparent from the following description of a preferred embodiment as illustrated in the accompanying drawing wherein like reference characters denote corresponding parts throughout.

In the drawing:

Fig. 1 is a view in elevational perspective of a Christmas tree stand illustrating one form of the present improvements and showing its application.

Fig. 2 is a top plan view of Fig. 1.

Fig. 3 is a view of the stand of Figs. 1 and 2 but in folded position.

Fig. 4 is a top plan view showing a modified form, and,

Fig. 5 is a view of Fig. 4 in elevation.

Referring to Figs. 1 to 3 inclusive the present Christmas stand is shown as having base members 1, 2 formed preferably of strips of metal or similar material, said strips being of counterpart formation, each strip being flat throughout the greater portion of its extent and adjacent each end each strip is twisted as at 3 into a position at right angles to its main or body portion. The strips are pivotally connected together at substantially their longitudinal central portions by the stud 4 and each strip is formed further with a small perforation 5 located inwardly or toward the center a short distance, which perforations permit the members 1, 2 to be removably secured by nails or screws to the floor if desired.

Pivotally secured to the ends of each strip by rivets or the like 6 are the duplicate arms or links 7 comprising flat strips movable in the plane of the related strip member, said arms being of a length but slightly greater than one half that of a strip, each arm at its free extremity being preferably sharpened to form a cutting edge of blade 7a. In applying the tree stand to a tree 8 the strips 1, 2 are disposed at substantially right angles to each other and the tree end disposed upon the stud 4 which is then forced into the tree. The arms 7 are then moved toward each other and caused to engage and bite into the tree which is then supported upright in and by the stand.

Referring now to Figs. 4 and 5 in which a modified form of Christmas tree stand is provided the reference numerals 9 and 10 denote base members comprising twin flat strips pivotally connected at their longitudinal centers by the stud 11, the ends of each strip being twisted upwardly to provide terminal ears 12 to which are pivotally secured the inwardly and upwardly directed brace arms 13, four in number, having their free terminations twisted and forked for engagement with the tree, said braces being adapted for movement in the planes of their associated base members, said braces being of counterpart formation.

A piece of steel wire 14 or the like is passed through small perforations in the brace arms to secure them in more positive engagement with the tree and the ends of the wire twisted as at 15. If greater rigidity is desired a somewhat flexible or resilient anchor ring 16 is placed about the brace arms from their upper free ends before the tree is introduced therebetween, this ring adapted to frictionally retain its adjusted position yieldingly and formed upon its inner periphery with small spaced recesses or pits 17 to facilitate gripping, the angle of said pitted ring portions to the perpendicular being common to that of the upper portions of the arms 13.

Upstanding prongs 17a, four in number, are secured to the base members, the upper ends of said prongs being bent outward slightly, the prongs being of resilient material and spaced to snugly receive therebetween the lower end of the tree to frictionally engage and retain same in position. This form of stand is conveniently applied by introducing the tree and the ring to the arms, disposing the end of the tree between the prongs and then applying the wire to the arms and twisting the wire ends together.

What is claimed is:

In a tree holder, pivotally connected base members, angular brace arms pivotally connected to said base members, the free ends of said brace arms being twisted and forked, a wire connecting said brace arms, a resilient pitted anchor ring adjustably connecting said brace arms above said wire, and resilient prongs carried by said base members spaced apart to receive the tree.

HERMAN AMIL SMITH.

REFERENCES CITED

The following references are of record in the file of this patent:

UNITED STATES PATENTS

| Number | Name | Date |
|---|---|---|
| 694,865 | Kachold | Mar. 4, 1902 |
| 781,552 | Riek | Jan. 31, 1905 |
| 1,240,319 | Cronick | Sept. 18, 1917 |
| 1,457,820 | Cleveland | June 5, 1923 |
| 1,546,314 | Prince | July 14, 1925 |
| 1,874,119 | Propst | Aug. 30, 1932 |
| 1,876,276 | Danner | Sept. 6, 1932 |